United States Patent [19]
Burrahm et al.

[11] Patent Number: 5,353,776
[45] Date of Patent: Oct. 11, 1994

[54] METHOD AND APPARATUS FOR CONTROLLING FUEL FLOW TO LEAN BURN ENGINES

[75] Inventors: Robert W. Burrahm; David P. Meyers, both of, San Antonio, Tex.

[73] Assignee: Southwest Research Institute, San Antonio, Tex.

[21] Appl. No.: 34,605

[22] Filed: Mar. 22, 1993

Related U.S. Application Data

[63] Continuation of Ser. No. 853,500, Mar. 18, 1992, abandoned.

[51] Int. Cl.5 .................. F02D 41/14; F02M 23/04
[52] U.S. Cl. .................. 123/700; 123/585; 123/704
[58] Field of Search ........... 123/704, 700, 442, 585, 123/586, 587, 588

[56] References Cited

U.S. PATENT DOCUMENTS

| | | | |
|---|---|---|---|
| 1,916,938 | 4/1933 | Small. | |
| 2,698,613 | 4/1955 | Jagersberger | 123/119 |
| 4,083,341 | 4/1993 | Brettschneider et al. | 123/587 |
| 4,084,563 | 4/1978 | Hattori et al. | 123/119 |
| 4,129,105 | 12/1978 | Ito et al. | 123/119 |
| 4,156,415 | 5/1979 | Beller et al. | 123/124 |
| 4,182,295 | 1/1980 | Beller et al. | 123/119 |
| 4,271,667 | 6/1981 | Mitsuda et al. | 60/276 |
| 4,660,519 | 4/1987 | Stocker et al. | 123/339 |
| 4,751,907 | 6/1988 | Yamamoto et al. | 123/489 |
| 4,886,034 | 12/1989 | Lambert | 123/587 |

FOREIGN PATENT DOCUMENTS 1-208555 8/1989 Japan ................... 123/700

*Primary Examiner*—Andrew M. Dolinar
*Attorney, Agent, or Firm*—Baker & Botts

[57] ABSTRACT

The system for controlling the air/fuel mixture introduced into a lean burn engines includes a fuel/air mixing carburetor that is connected to the intake conduit to the engine and an air by-pass conduit that is also connected to the intake conduit. The main throttle valve is located downstream of the connection between the carburation conduit and the by-pass conduit so that mixing of the carbureted fuel/air mixture with the by-pass air occurs upstream of the main throttle valve. Accordingly, the main throttle valve does not control the air/fuel ratio but rather controls the quantity of fuel being introduced into the engine. The by-pass throttle valve may be controlled by an oxygen sensor in the exhaust system or by a fuel sensor in the intake system, when operating on natural gas, gasoline, hydrogen or alcohol fuel, as desired.

10 Claims, 1 Drawing Sheet

METHOD AND APPARATUS FOR CONTROLLING FUEL FLOW TO LEAN BURN ENGINES

CROSS REFERENCE TO RELATED APPLICATIONS

This application is a continuation of application Ser. No. 07/853,500 filed Mar. 18, 1992, entitled "Method and Apparatus for Controlling Fuel Flow to Lean Burn Engines" by Robert W. Burrahm and David P. Meyers, now abandoned.

TECHNICAL FIELD OF THE INVENTION

This invention relates generally to apparatus and methods for controlling air/fuel mixtures to lean burn engines. More particularly, but not by way of limitation, this invention relates to an improved method and apparatus for controlling the flow of air through a by-pass conduit for mixing with the air/fuel mixture before entering the lean burn engine.

BACKGROUND OF THE INVENTION

The concept of providing lean air/fuel mixtures to engines is not new. For example, U.S. Pat. No. 1,916,938 which issued Jul. 4, 1933 describes the use of a by-pass air conduit in a carbureted engine to reduce the amount of fuel in the air/fuel mixture to increase the efficiency of the engine. In the '938 patent, the system described utilizes a standard carburation system with a by-pass conduit which provides additional air to the engine under certain operating conditions.

U.S. Pat. Nos. 4,084,563; 4,182,295; and 4,751,907 illustrate various systems that have been designed for providing additional air to the engine aside from that normally provided through the carburation system. The supplementary air provides a leaner fuel mixture which not only makes the engine operate more efficiently, but also reduces some of the pollutants produced when the engine is operating. In each of the above patents, and all of the systems are somewhat different, the by-pass air conduit with its attendant control valve connects with the air inlet to the engine downstream of the main throttle valve. Introducing the extra air below the main throttle valve allows a wider range of air/fuel ratios. However, any change in the main throttle valve position drastically disrupts the air/fuel ratio by shifting the balance of flow between the two air paths. The foregoing systems may be described as those systems wherein the mixing of the carbureted air/fuel and of the by-pass air occurs downstream of the main throttle valve control for the engine.

An object of this invention is to provide a system wherein the extra or by-pass air is introduced upstream of the main throttle valve and thus any change in the main throttle valve position affects the flow in both the flow paths maintaining a nearly constant air/fuel ratio over varying engine speeds.

In connection with the prior art air/fuel control systems, there have also been utilized sensors located in the intake or the exhaust systems for determing the fuel in the intake or the content of oxygen or $O_2$ in the exhaust system of the engine. Both of these sensors have been utilized to control the by-pass throttle valve and in some instances the main throttle valve in an effort to control the air/fuel mixture over the various operating conditions of the engine.

With the mixing of air and fuel upstream of the main throttle valve, it is only necessary to control the by-pass throttle valve to provide the appropriate air/fuel mixture for the engine over its operating range.

SUMMARY OF THE INVENTION

In one aspect, this invention then provides a fuel control system for lean burn engines wherein a carburetor is used for mixing fuel and air, an intake conduit connects the carburetor with the intake manifold, an air by-pass conduit is connected with the intake conduit, a by-pass throttle valve is located in the by-pass conduit for controlling the air flow through the by-pass conduit to the intake conduit, and a main throttle valve is located in the intake conduit between the connection of the by-pass conduit and the intake manifold for controlling the air/fuel mixture delivered to the engine.

In another aspect, this invention contemplates an improved method for controlling the air/fuel ratio in lean burn engines that comprises the steps of mixing the air and fuel to form an air/fuel mixture for burning in the engine, supplying additional air through a by-pass conduit into the mixture prior to introduction of the mixture into the engine to form a lean air/fuel mixture, controlling the volume of the lean air/fuel mixture to be supplied to the engine, and introducing the lean air/fuel mixture into the engine.

BRIEF DESCRIPTION OF THE DRAWINGS

The foregoing and additional objects and advantages of the invention will become more apparent as the following detailed description is read in conjunction with the accompanying drawing wherein like reference characters denote like parts in all view and wherein.

DETAILED DESCRIPTION OF THE INVENTION

Figure 1:
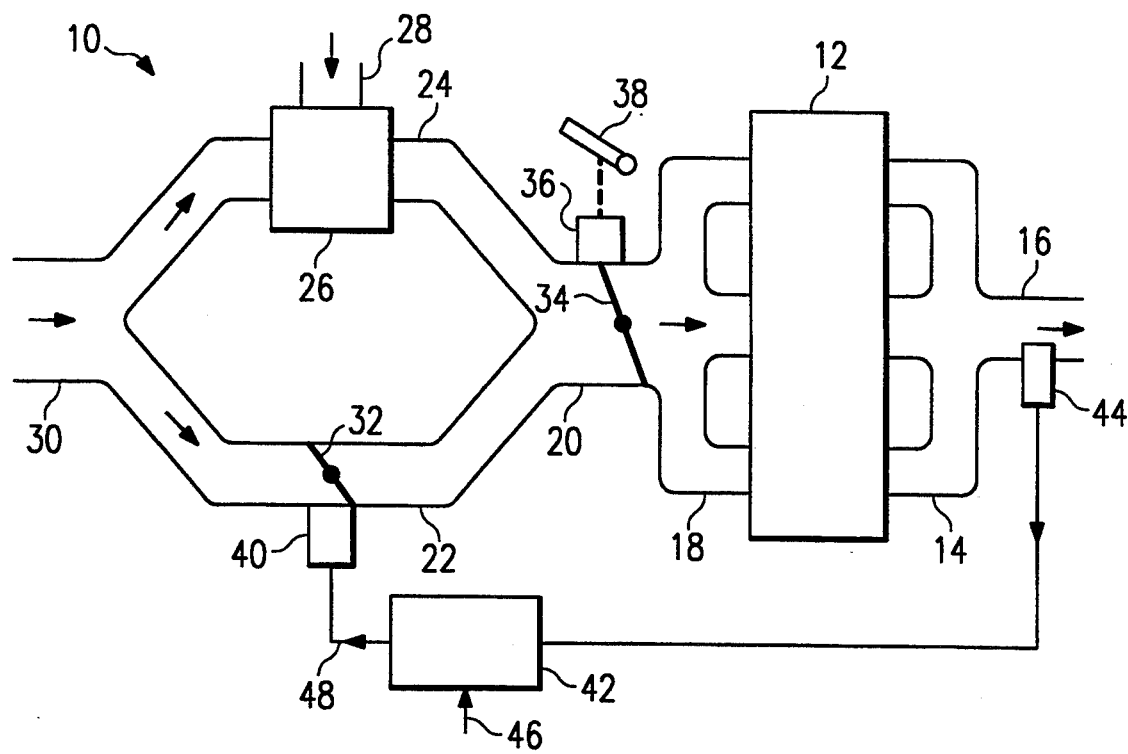
FIG. 1 is a schematic diagram illustrating a fuel system that is constructed in accordance with the invention.

Referring to the drawing and to FIG. 1 in particular, shown therein and generally designated by the reference character 10 is a fuel control system that is constructed in accordance with the invention the system 10 is operably associated with an engine 12.

The engine 12 includes an exhaust manifold 14 having an exhaust pipe 16 connected thereto. The engine 12 also includes an intake manifold 18 having an intake conduit 20 connected thereto. Connected to the intake conduit 20 is a by-pass conduit 22 and a carburetor conduit 24.

Located in the carburetor conduit 24 is a carburetor or mixer 26 that will be appropriately arranged and constructed to mix, either gaseous or liquid fuels with air, in accordance with the requirements of the engine 12. The fuel is supplied to the carburetor 26 through a fuel inlet 28 while air is supplied to the carburetor 26 through an air inlet 30. The inlet 30 may be provided with a filter as desired. The carburetor 26 is set for maximum fuel richness.

A by-pass throttle valve 32 is located in the by-pass conduit 22 to control the quantity of air flowing through the by-pass conduit 22. In the intake conduit 20 there is located a main throttle valve 34 that controls the quantity of the mixture resulting from mixing of the air/fuel flowing through the conduit 24 and the by-pass air flowing through the conduit 22, to the engine 12. The throttle valve 34 is sized to give maximum desired lean operation when fully open.

As illustrated in FIG. 1, the main throttle valve 34 is provided with an actuator 36 that is appropriately connected with a throttle control 38. Similarly, the by-pass throttle valve 32 is provided with an actuator 40.

The actuator 40 is operably connected with a comparator 42 which is in turn connected to a sensor 44. As illustrated, the sensor 44 is located in the exhaust pipe 16 and is provided for the purpose of sensing the oxygen content in exhaust gases flowing from the engine.

The sensor 44 is also arranged to transmit a signal that is representative of the oxygen content in the exhaust gas to the comparator 42. A set point signal 46 is introduced into the comparator 42 for the purpose of inputting into the comparator 42 the desired level of oxygen that should be in the exhaust pipe 16. In the event that the signal transmitted from the sensor 44 is either higher or lower than the set point signal 46, an output signal 48 is transmitted to the actuator 40 to position the by-pass throttle valve 32 to permit more or less air to flow through the by-pass conduit 22 to be mixed with the carbureted fuel in the intake conduit 20.

In operation, the engine 12 is started and, assuming that the by-pass throttle valve 32 is closed, inlet air flows through the air inlet 30 into the carburetor 26 where it is mixed with fuel which is admitted into the engine 12 depending on the position of the main throttle valve 34. As the engine operates, the oxygen in the exhaust gas passing through the exhaust pipe 16 is sensed by the sensor 44 and a signal representative of the oxygen content is transmitted to the comparator 42. Assuming that a set point signal has been introduced into the comparator 42, that signal is compared with the signal that is representative of the oxygen content in the exhaust gas, and an output signal 48 is transmitted to the actuator 40. Upon receipt of the output signal 48, the actuator 40 positions the by-pass throttle valve 32 so that the appropriate amount of air is passed through the by-pass conduit 22 to lean out the air/fuel mixture flowing through the carburetor conduit 24.

It should be noted at this point, that the position of the main throttle valve 34 is determined by the actuator 36 through the pedal or hand throttle lever 38. The position of the main throttle valve 34 does not affect the air/fuel ratio of the fuel entering the engine 12. As a result of this, the engine 12 can be operated over a range of speeds and loads while the main throttle valve 34 simply controls the total mixture being introduced into the engine. If a higher or lower air/fuel ratio for the air/fuel mixture is required, the oxygen sensor 44 transmits the appropriate signal so that the by-pass throttle valve 32 is positioned to provide more or less air as needed to provide the air/fuel mixture required by the engine 12. Accordingly, the system illustrated in FIG. 1 provides excellent control of the air/fuel ratio.

DESCRIPTION OF THE MODIFICATION OF FIG. 2

Figure 2:
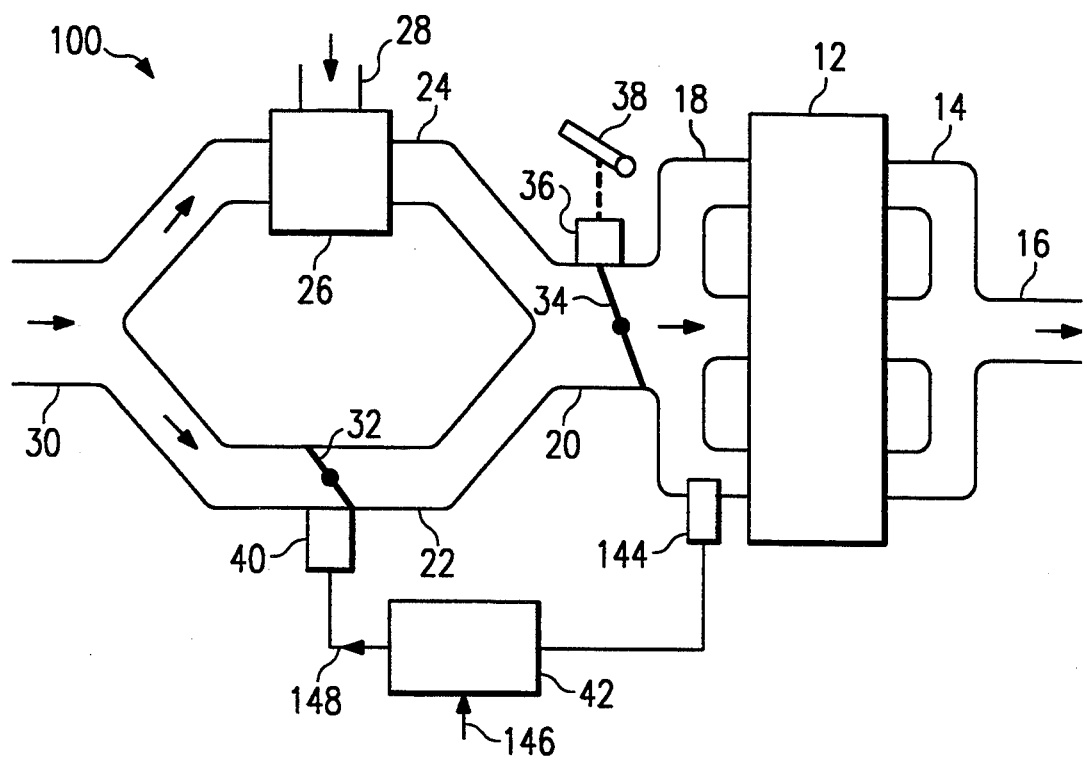
FIG. 2 is a modification of the embodiment of fuel control system illustrated in FIG. 1 that is also constructed in accordance with the invention.

As will be appreciated by comparing FIGS. 1 and 2, the systems are virtually identical with the exception of the control apparatus used for positioning the by-pass throttle valve 32. Accordingly, the system of FIG. 2 will not be described in detail.

In the system of FIG. 2, a sensor 144 is positioned in the intake manifold 18. The sensor 144 transmits a signal that is representative of the fuel content of the air/fuel mixture being supplied to the engine 12. As was described in connection with the system of FIG. 1, a set point signal 146 is introduced into the comparator 42 and the signal from the sensor 144 is compared to the set point signal 146 and an output signal 148 is transmitted to the actuator 40. Upon receipt of the output signal 148, the actuator 40 positions the by-pass throttle valve 32 appropriately to permit the quantity of air to flow through the by-pass conduit as necessary to obtain the desired fuel content of the air/fuel mixture being introduced into the engine 12. Again, it should be stressed that the mixing of the by-pass air and the air/fuel mixture from the carburetor 26 occurs upstream of the main throttle valve 34.

From the foregoing detailed description, it will be appreciated that the systems provided operate utilizing a method for controlling the air/fuel ratio in lean burn engines wherein the mixing of the air/fuel mixture from the carburetor with the by-pass air occurs upstream of the main throttle valve. The main throttle valve controls the volume of air/fuel mixture flowing to the engine and does not affect the air/fuel ratio. Change in the air/fuel ratio occurs as a result of controlling the volume of by-pass air with the use of the by-pass throttle valve 32.

The position of the by-pass throttle valve 32 may be controlled by a sensor system utilizing either the oxygen content of the exhaust gas or the fuel content of the air/fuel mixture being introduced into the engine.

From the foregoing detailed description, it will be appreciated that a very effective method and apparatus is provided for controlling the air/fuel ratio of a fuel mixture being introduced into lean burn engines. Many changes or modifications can be made to the invention as described without departing from the spirit or scope of the invention.

What is claimed is:

1. A fuel control system for lean burn engines having intake and exhaust manifolds comprising:
   a carburetor for mixing fuel and air;
   an intake conduit connecting the carburetor with the intake manifold;
   an air by-pass conduit connected with said intake conduit;
   a by-pass throttle valve located in said by-pass conduit for controlling the air flow through said by-pass conduit to said intake conduit;
   a main throttle valve located in said intake conduit between the connection of said by-pass conduit with said intake conduit and said intake manifold for controlling the air/fuel mixture from said intake conduit and by-pass conduit into said engine;
   first control means for changing the position of said main throttle valve to vary the quantity of the mixture supplied to said engine;
   second control means for changing the position of said by-pass throttle valve to change the ratio of the mixture supplied to said engine independent from the position of said main throttle valve, and
   wherein the position of said by-pass throttle valve remains essentially unaffected by changes in the position of the main throttle valve.

2. The fuel control system of claim 1 wherein said control means includes:
   a sensor responsive to an engine operating characteristic for transmitting a first signal representative of such characteristic; and a valve actuator connected with said by-pass throttle valve arranged to be responsive to said first signal for positioning said by-pass throttle valve in accordance with said first signal.

3. The system of claim 2 and also including means for receiving said first signal, comparing said first signal to an input signal representative of a desired air/fuel mixture based on said engine operating characteristic and transmitting an output signal representative of the difference between said first signal and said input signal to said valve actuator to provide more or less air through said by-pass conduit.

4. The system of claim 3 wherein said sensor is located to sense the fuel content in said air/fuel mixture supplied to said engine.

5. The fuel control system of claim 1 further comprising a sensor in the intake manifold to sense the fuel content of the air/fuel mixture being supplied to said engine; and said second control means changing the position of said by-pass throttle valve in response to said sensed fuel content.

6. A method for controlling the air/fuel ratio in a lean burn engine having an intake conduit connected with an intake manifold and a main throttle valve located in said intake conduit comprising the steps of:

mixing air and fuel to form an air/fuel mixture for burning in the engine;

supplying additional air through a by-pass conduit having a by-pass throttle valve into said mixture prior to introduction of said mixture into said engine to form a lean air/fuel mixture;

controlling the volume of said lean air/fuel mixture to be supplied to said engine by positioning said main throttle valve;

sensing the fuel content of said lean air/fuel mixture in said intake manifold;

introducing said lean air/fuel mixture into said engine through said main throttle valve and said intake manifold;

comparing an input signal representative of the desired fuel content of the air/fuel mixture to the signal representative of said sensed fuel content; and transmitting an output signal representative of the difference between said input signal and said signal representative of said sensed fuel content to said by-pass throttle valve in said by-pass conduit to position said by-pass throttle valve in accordance with the desired fuel content as represented by said input signal whereby the position of said by-pass throttle valve remains essentially unaffected by changes in the position of said main throttle valve.

7. The method of claim 6 and also including the steps of:

transmitting a signal representative of the CH$_4$ content to said by-pass throttle valve in said by-pass conduit; and changing the volume of additional air to vary the lean air/fuel mixture by positioning said by-pass throttle valve in response to said signal, if required, to maintain a predetermined air/fuel mixture.

8. A method for controlling the air/fuel ratio in a lean burn engine having an intake conduit connected with an intake manifold and a main throttle valve located in said intake conduit comprising the steps of:

mixing air and fuel to form an air/fuel mixture for burning in the engine;

supplying additional air through a by-pass conduit having a by-pass throttle valve into said mixture prior to introduction of said mixture the said engine to form a lean air/fuel mixture;

introducing said lean air/fuel mixture into the engine through said main throttle valve and said intake manifold;

controlling the volume of said lean air/fuel mixture supplied to the engine by changing the position of said main throttle valve;

sensing the O$_2$ content of exhaust gas from the engine;

transmitting a signal representative of the O$_2$ content to said by-pass throttle valve located in said by-pass conduit; and changing the volume of said additional air to vary the lean air/fuel mixture by positioning said by-pass throttle valve in response to said representative signal to maintain a predetermined air/fuel mixture wherein the position of said by-pass throttle valve remains essentially unaffected by changes in the position of the main throttle valve.

9. The method of claim 8 and also including the steps of:

comparing an input signal representative of the desired O$_2$ content of exhaust gas from the engine to the signal representative of the sensed O$_2$ content of the exhaust gas; and transmitting an output signal representative of the difference between said input signal and said signal representative of the sensed O$_2$ content of the exhaust gas to said by-pass throttle valve to position said by-pass throttle valve in accordance with the desired value of O$_2$ content in the exhaust gas as represented by said input signal.

10. A fuel control system for lean burn engines having intake and exhaust manifolds comprising:

a carburetor for mixing fuel and air;

an intake conduit connecting said carburetor with said intake manifold;

an air by-pass conduit connected with said intake conduit;

a by-pass throttle valve located in said air by-pass conduit for controlling the air-flow through said air by-pass conduit to said intake conduit;

a main throttle valve located in said intake conduit between the connection of said air by-pass conduit with said intake conduit and said intake manifold for controlling the volume of said air/fuel fixture flowing from said intake conduit and said air by-pass conduit into said engine;

a sensor in said intake manifold to sense the fuel content of the air/fuel mixture being supplied to said engine through said main throttle valve;

a comparator having a set point corresponding to a desired air/fuel mixture; and means including said comparator for changing the position of said by-pass throttle valve to change the ratio of the mixture supplied to said engine to provide the desired air/fuel mixture independent from the position of said main throttle valve whereby the position of said by-pass valve remains essentially unaffected by changes in the position of said main throttle valve.

* * * * *